(12) United States Patent
Ueno

(10) Patent No.: US 8,271,482 B2
(45) Date of Patent: Sep. 18, 2012

(54) INFORMATION PROCESSING DEVICE

(75) Inventor: Atsuko Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 216 days.

(21) Appl. No.: 12/630,615

(22) Filed: Dec. 3, 2009

(65) Prior Publication Data

US 2010/0174723 A1  Jul. 8, 2010

(30) Foreign Application Priority Data

Jan. 6, 2009 (JP) ................................. 2009-000679

(51) Int. Cl.
 *G06F 7/00* (2006.01)
(52) U.S. Cl. ........................................................ 707/723
(58) Field of Classification Search ........................ None
 See application file for complete search history.

(56) References Cited

U.S. PATENT DOCUMENTS

2007/0067305 A1* 3/2007 Ives ................................ 707/10
2010/0023506 A1* 1/2010 Sahni et al. ....................... 707/5

FOREIGN PATENT DOCUMENTS

JP 10-11458 A 1/1998

* cited by examiner

*Primary Examiner* — Truong Vo

(57) ABSTRACT

The information processing device includes an access history acquiring unit which acquires and stores access history information showing access history for the contents accessed by a user terminal, and a relevancy setting unit which relates the accessed contents. As the access history information, the access history acquiring unit acquires content identification information, access date and time information, and application identification information for identifying a content access application making access to the content, which is different for each of the content access applications operated on the user terminal. The relevancy setting unit generates and stores the relevance information by mutually relating the content identification information based on the access date and time information and the application identification information contained in each of the different contents.

13 Claims, 12 Drawing Sheets

FIG.3

| Browsing log ID | User ID | Session ID | Content ID | Time |
|---|---|---|---|---|
| 0001 | X | aaaa | A | 2008/9/9 10:00:00 |
| 0002 | X | aaaa | E | 2008/9/9 10:00:30 |
| 0003 | X | bbbb | D | 2008/9/9 10:05:45 |
| 0004 | Y | cccc | C | 2008/9/9 10:16:00 |
| 0005 | Y | cccc | A | 2008/9/9 10:30:00 |
| 0006 | X | aaaa | B | 2008/9/9 10:31:00 |
| 0007 | X | bbbb | F | 2008/9/9 10:31:30 |
| 0008 | X | aaaa | C | 2008/9/9 10:32:00 |
| 0009 | X | aaaa | B | 2008/9/9 10:33:08 |
| ... | ... | ... | ... | ... |

| Relevance degree ID | Content ID_1 | Content ID_2 | Point |
|---|---|---|---|
| 0001 | A | B | 5 |
| 0002 | B | C | 65 |
| 0003 | A | C | 25 |
| 0004 | A | D | 20 |
| 0005 | C | D | 30 |
| : | : | : | : |

(B)

| Relevance degree ID | Content ID_1 | Content ID_1 | Point |
|---|---|---|---|
| 0003 | A | C | 25 |
| 0004 | A | D | 20 |
| 0001 | A | B | 5 |

FIG.10

| Weight group ID | Weight ID | Minimum value of time threshold value | Maximum value of time threshold value | Weight |
|---|---|---|---|---|
| 0001 | 0001 | 0:00:00 | 0:10:00 | 5 |
| 0001 | 0002 | 0:10:00 | 0:30:00 | 3 |
| 0001 | 0003 | 0:30:00 | 1:00:00 | 1 |
| 0002 | 0001 | 0:00:00 | 0:20:00 | 5 |
| 0002 | 0002 | 0:20:00 | 1:00:00 | 3 |
| .. | .. | .. | .. | .. |

FIG.11

| User ID | Password | Name | Weight group ID |
|---------|----------|------|-----------------|
| X | **** | xxxx | 0001 |
| Y | **** | yyyy | 0001 |
| Z | **** | zzzz | 0002 |
| ·· | ·· | ·· | ·· |

INFORMATION PROCESSING DEVICE

INCORPORATION BY REFERENCE

This application is based upon and claims the benefit of priority from Japanese patent application No. 2009-000679, filed on Jan. 6, 2009, the disclosure of which is incorporated herein in its entirety by reference.

TECHNICAL FIELD

The present invention relates to an information processing device and, more specifically, to an information processing device which manages users' access histories to information.

BACKGROUND ART

Recently, in accordance with developments of the Internet, systems with which contents such as knowledge and opinions of individuals are shared by many people have been operated by using websites on the Internet. Examples thereof are knowledge bases which manage common knowledge regarding services and operations in business firms and word-of-mouth sites operated by accumulating word-of-mouth information of consumers.

As a means for viewers to search contents in the above-described systems, it is common to designate attributes given to the contents in advance and keywords contained in the contents and to execute full-text search. Further, when contents creators register the contents, the creators have been trying to support viewers to be able to collect information efficiently by putting references to the contents that are related to the contents created by the creators themselves. However, there are followings issues with such systems.

First, since the contents are created by individuals, those contents are created based on the creator's personal viewpoint. Therefore, there is a possibility that the attributes added by the creator to the contents and words and the like used in expressions of the contents do not match with those conjectured by a system manager and a viewer. In such case, for example, if the viewer executes category designation, keyword designation, full-text search, etc., for finding target contents, the viewer cannot find the contents even if there are the contents desired by the viewer existing in the system.

Further, when the relevancy between contents is designated manually, relevancy between the contents can only be given at limited timing such as when the contents creator register or correct the contents. In that case, setting of the relevancy between already-existing contents and newly registered contents may be missed out.

For such issue, the system disclosed in Patent Document 1 monitors access to information made by a user is monitored at all times to create an access history database, and extracts information having an access history near the time at which a reference document is accessed from the database. Then, the extracted information is outputted to a screen as the information related to the reference document. Furthermore, Patent Document 1 also discloses a method for evaluating the relevancy according to access time intervals with respect to the reference document.

Patent Document 1: Japanese Unexamined Patent Publication H10-11458

However, with the technique described above, there may be cases where the relevancy between the contents is not necessarily adequate. For example, when a user conducts a plurality of searches simultaneously by utilizing websites on the Internet, the relevancy between information pieces may be low even those are the information pieces accessed at short-time interval from each other. If so, information having adequate relevancy with respect to specific information cannot be extracted, so that it is not possible to search information and provide information efficiently.

SUMMARY

It is therefore an exemplary object of the present invention to improve the efficiency for searching information and providing information, which are the issues of the above-described technique.

An information processing device according to an exemplary aspect of the present invention for achieving the foregoing object employs a following structure. That is, the information processing device includes: an access history acquiring unit which, for each of accessed contents, acquires and stores access history information showing access history for the contents accessed by a user terminal by utilizing a content access application installed to the user terminal; and a relevancy setting unit which relates the contents accessed by the user terminal based on the access history information acquired by the access history acquiring unit, and stores relevance information showing a relevance state between the contents, wherein: as the access history information, the access history acquiring unit acquires content identification information which identifies the accessed content, access date and time information which shows date and time at which the content is accessed, and application identification information for identifying the content access application making access to the content, which is different for each of the content access applications operated on the user terminal; and the relevancy setting unit generates and stores the relevance information by relating the content identification information contained in each piece of the access history information corresponding to each of the different contents based on the access date and time information and the application identification information contained in each piece of the access history information corresponding to each of the different contents.

Further, a program according to another aspect of the present invention employs a following structure. That is, the program causes an information processing device to execute: an access history acquiring unit which, for each of accessed contents, acquires and stores access history information showing access history for the contents accessed by a user terminal by utilizing a content access application installed to the user terminal; and a relevancy setting unit which relates the contents accessed by the user terminal based on the access history information acquired by the access history acquiring unit, and stores relevance information showing a relevance state between the contents, wherein: the access history acquiring unit is provided with a function which, as the access history information, acquires content identification information which identities the accessed content, access date and time information which shows the date and time at which the content is accessed, and application identification information for identifying a content access application making access to the content, which is different for each of the content access applications operated on the user terminal; and the relevancy setting unit is provided with a function which generates and stores the relevance information by relating the content identification information contained in each piece of the access history information corresponding to each of the different contents based on the access date and time information and the application identification information contained in each piece of the access history information corresponding to each of the different contents.

Furthermore, an information processing method according to still another aspect of the present invention employs a following structure. That is, the information processing method: acquires and stores, for each of accessed contents, access history information showing access history for the contents accessed by a user terminal by utilizing a content access application installed to the user terminal; and relates the contents accessed by the user terminal based on the access history information acquired by the access history acquiring unit, and storing relevance information showing a relevance state between the contents, wherein: when acquiring the access history information, content identification information which identifies the accessed content, access date and time information which shows the date and time at which the content is accessed, and application identification information for identifying the content access application making access to the content, which is different for each of the content access applications operated on the user terminal, are acquired as the history information; and when storing the relevance information, the relevance information is generated and stored by relating the content identification information contained in each piece of the access history information corresponding to each of the different contents based on the access date and time information and the application identification information contained in each piece of the access history information corresponding to each of the different contents.

An exemplary advantage according to the present invention is that the present invention is structured in the above-described manner, so that it possible to relate the contents of high relevancy with each other efficiently, and efficient search and supply of information can be implemented by utilizing the related information.

BRIEF DESCRIPTION OF THE DRAWINGS

FIG. 3 is a table showing an example of information stored within the content providing device disclosed in FIG. 2;

FIG. 4 shows tables showing examples of information stored within the content providing device disclosed in FIG. 2;

FIG. 10 is a table showing an example of information stored within the content providing device disclosed in FIG. 9;

FIG. 11 is a table showing an example of information stored within the content providing device disclosed in FIG. 9.

EXEMPLARY EMBODIMENTS

First Exemplary Embodiment

Figure 1:
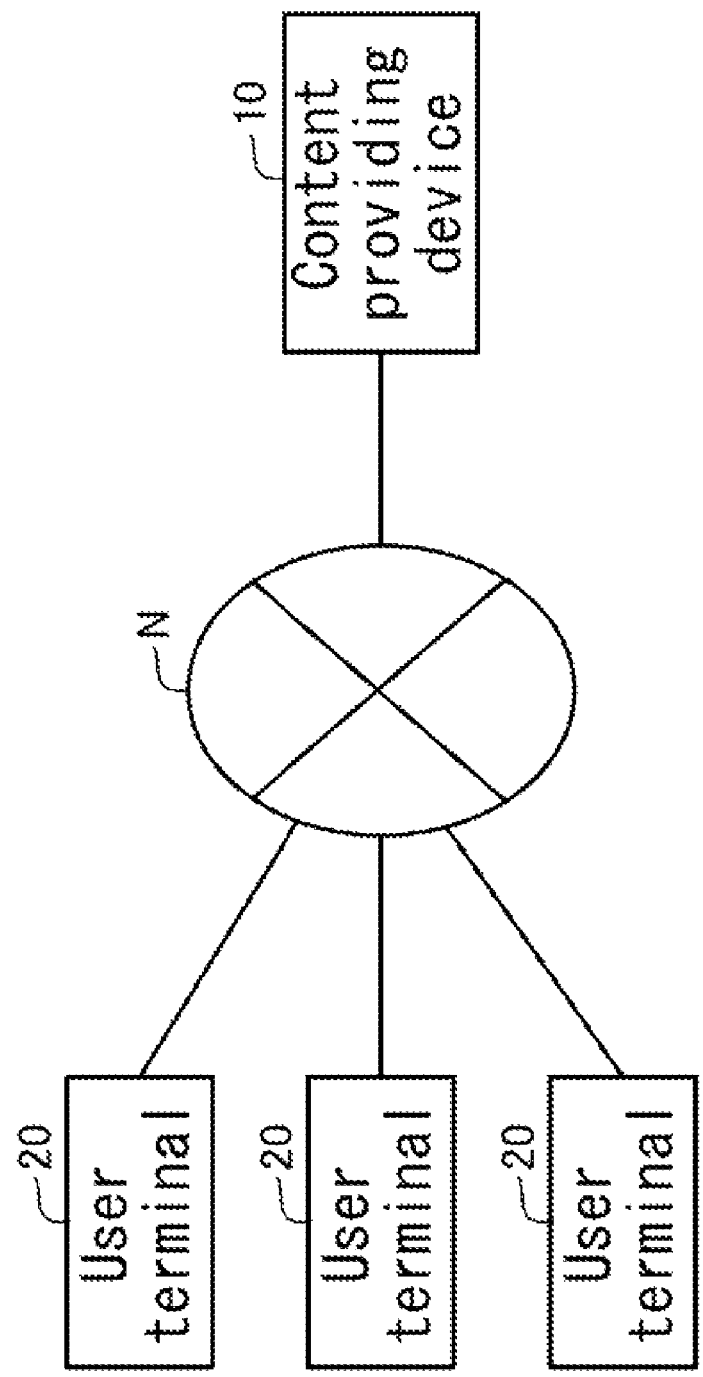
FIG. 1 is a block diagram showing an overall structure of a content providing system according to a first exemplary embodiment of the present invention.
Figure 2:
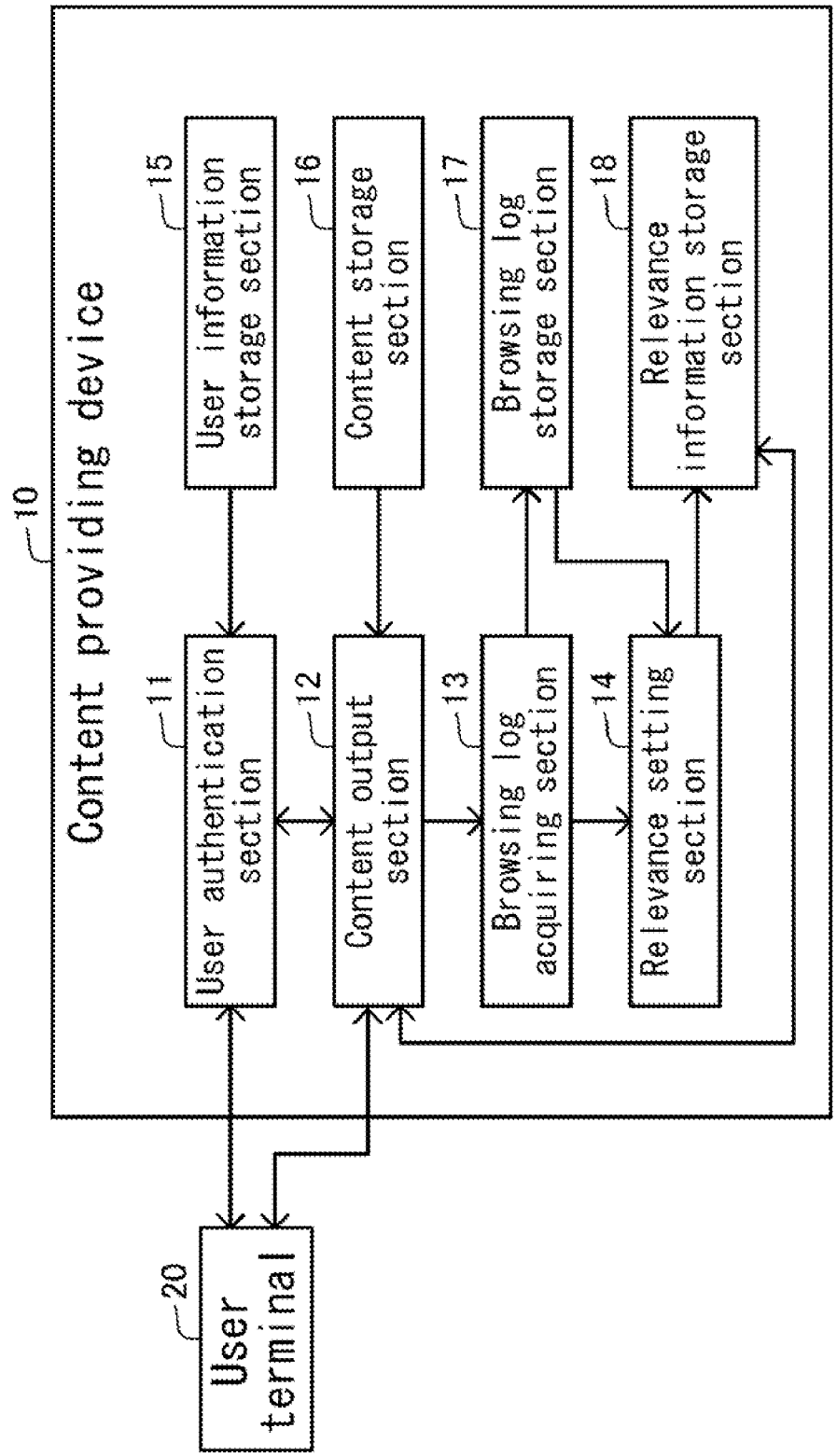
FIG. 2 is a functional block diagram showing the structure of the content providing device according to the first exemplary embodiment.
Figure 5:
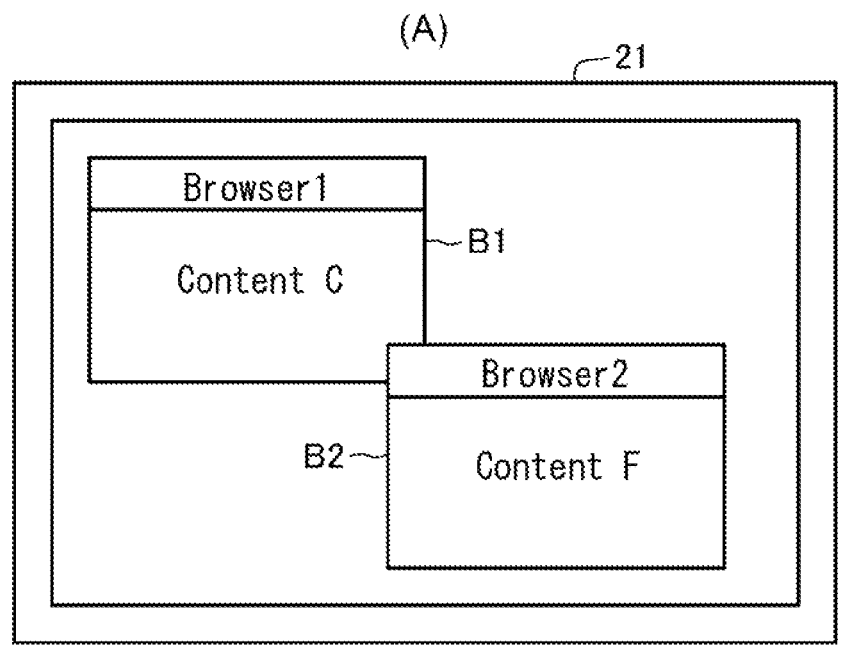
FIG. 5 shows examples of a screen displayed on a user terminal disclosed in FIG. 1.
Figure 5:
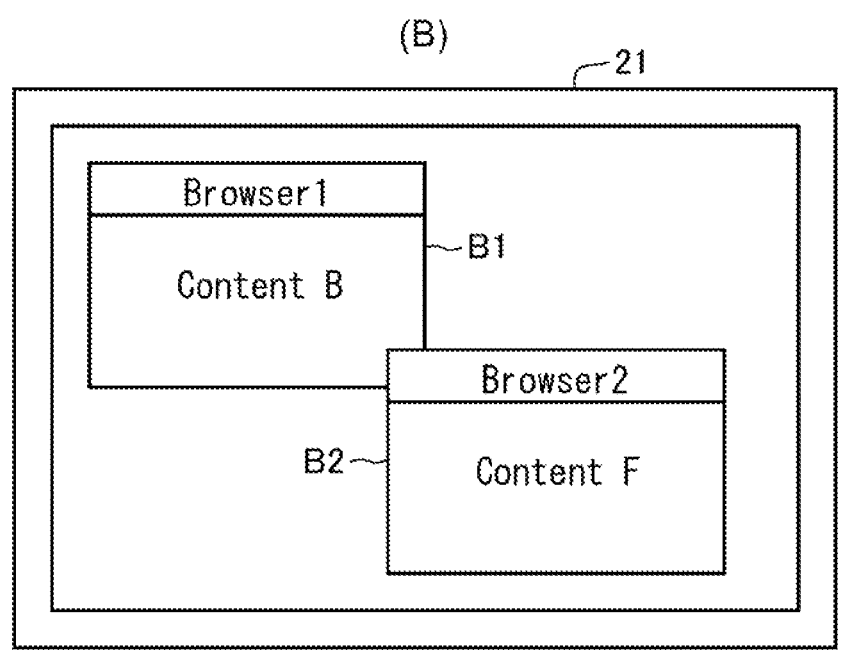
Figure 6:
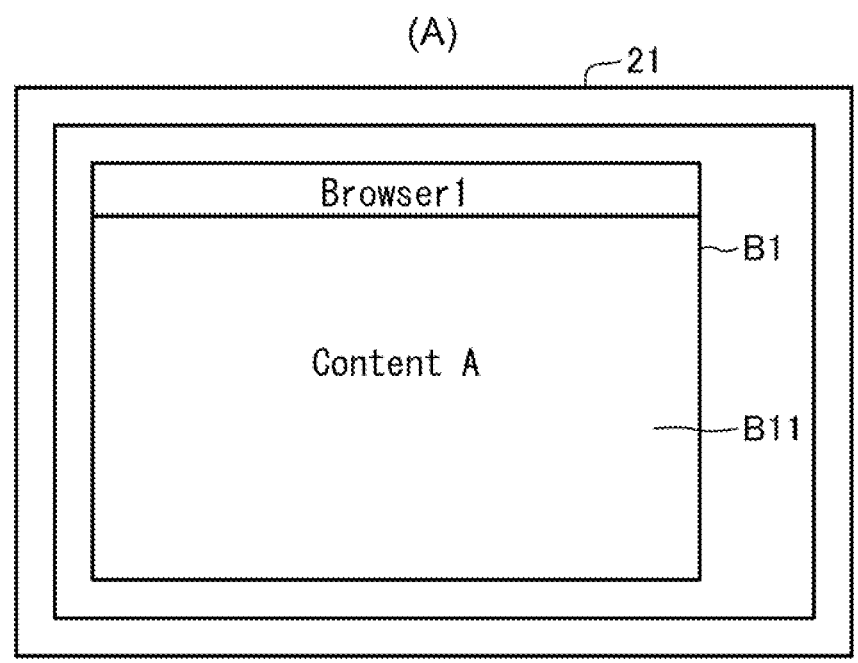
FIG. 6 shows examples of a screen displayed on the user terminal disclosed in FIG. 1.
Figure 6:
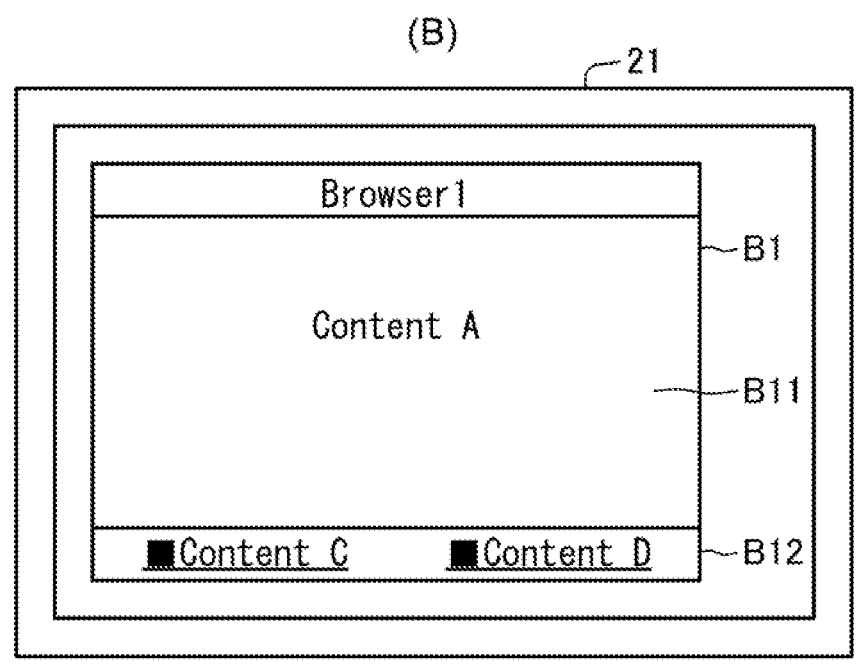
Figure 7:
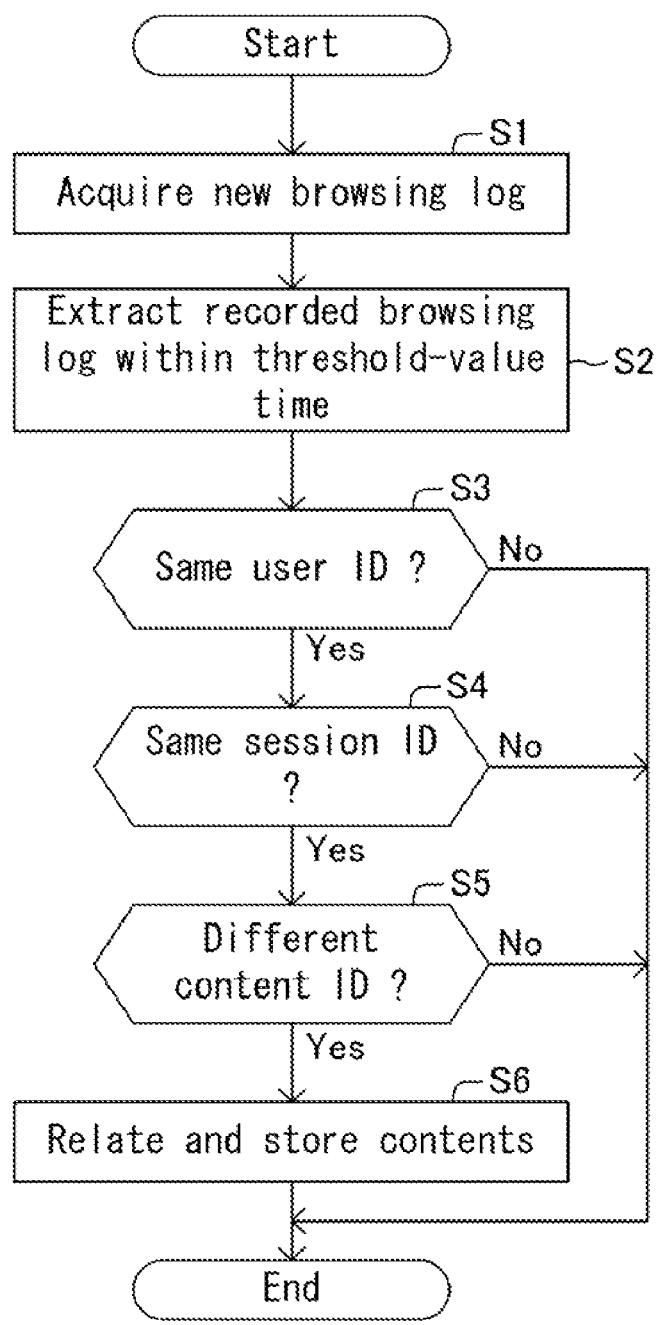
FIG. 7 is a flowchart showing operations of the content providing device disclosed in FIG. 2.
Figure 8:
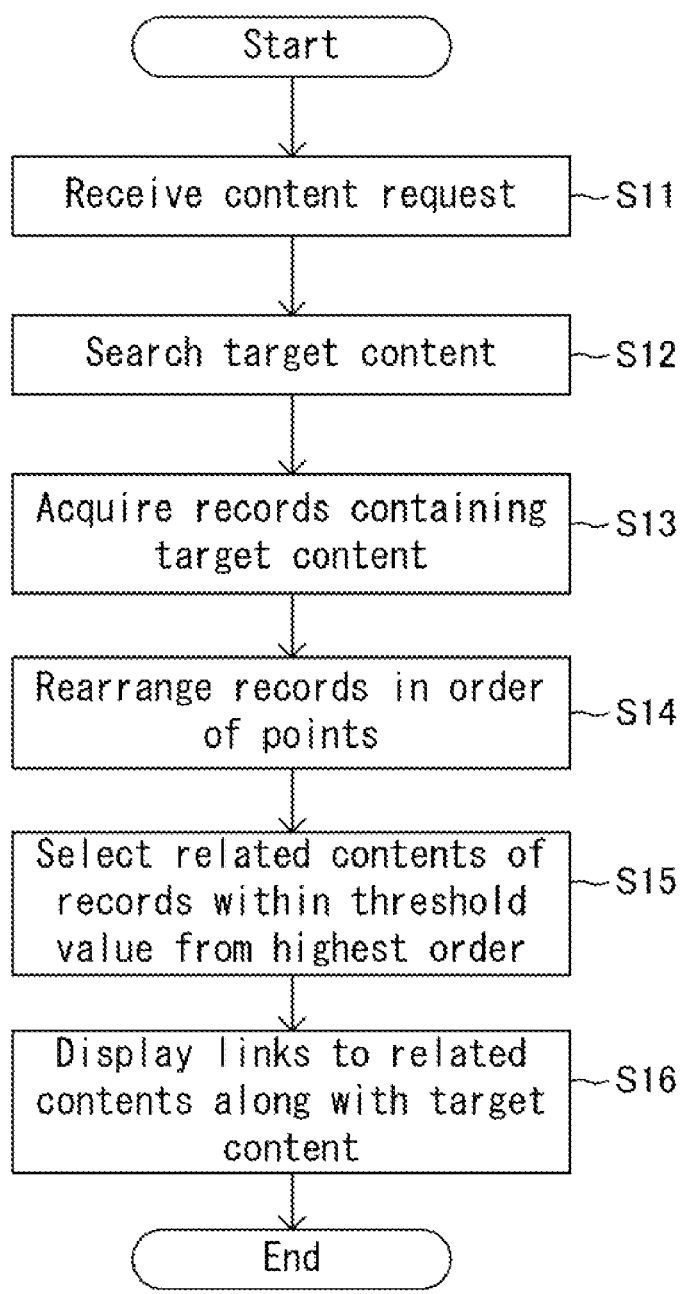
FIG. 8 is a flowchart showing operations of the content providing device disclosed in FIG. 2.

A first exemplary embodiment of the present invention will be described by referring to FIG. 1-FIG. 8. FIG. 1 is a block diagram showing an overall structure of a content providing system. FIG. 2 is a functional block diagram showing the structure of the content providing device. FIG. 3 and FIG. 4 are tables showing examples of information stored within the content providing device. FIG. 5 and FIG. 6 are examples of a screen displayed on a user terminal. FIG. 7 and FIG. 8 are flowcharts showing operations of the content providing device.

Note here that the first exemplary embodiment shows a specific example of an information processing device which will be disclosed in a third exemplary embodiment described later. Hereinafter, a content providing device that works to provide contents to a user terminal will be described as an example of the information processing device. It is to be noted, however, that the information processing device described later is not necessarily limited to a device that includes a function of providing contents but may be an information processing device which relays information between a user terminal and a content providing device.

(Structure)

As shown in FIG. 1, the content providing system according to this exemplary embodiment includes a content providing device 10 that is connected to user terminals 20 via a network N. The content providing device 10 functions as a web server which opens websites that provide prescribed contents. Hereinafter, each structure will be described in detail.

First, the user terminal 20 is a typical information processing terminal that is provided with a function of making access to websites, e.g., a personal computers, a portable telephones, etc. Specifically, the so-called browser, which is an application (content access application) having a function of making accesses to websites and displaying the contents, e.g., text data and image data disclosed on the websites, on the user terminal 20 for allowing users to browse the contents, is installed to the user terminal 20. Hereinafter, the application installed to the user terminal 20 for making access to the contents is called a "browser".

The user terminal 20 can start up a plurality of browsers on the user terminal 20. That is, a single user terminal 20 is capable of starting up a plurality of browsers by allowing each browser to operate individually and capable of opening a plurality of browser screens. Each of the browser screens opened on the user terminal 20 establishes a single session with the content providing device 10 as an access target. Therefore, the browsers generate session ID (application identification information) that is identification information different for each of the opened browser screens, and transmit the session ID to the content providing device 10.

With the embodiment, only the pre-registered users can browse the content depending on the characteristics of the content provided by the content providing device 10 to be described later. Therefore, the user terminal 20 also transmits user ID when making access to the website provided by the content providing device 10. When requesting the content to the website of the content providing device 10, the user terminal 20 transmits search request information containing information for specifying the content.

Next, the content providing device 10 will be described. The content providing device 10 according to the embodiment is a typical computer server including an arithmetic operation device and a storage device. Further, as shown in FIG. 2, the content providing device 10 includes a user authentication section 11, a content output section 12, a browsing log acquiring section 13, a relevancy setting section 14, which are built by installing a program to the arithmetic operation device. Furthermore, the content providing device 10 includes, in the storage device, a user information storage section 15, a content storage section 16, a browsing log storage section 17, and a relevance information storage section 18. The program is provided to the content providing device 10 while being stored in a recording medium such as a CD-ROM, for example. Alternatively, a program stored on a web server on the network is downloaded to the content providing device 10 via the Internet line, and provided to the content providing device 10.

The content storage section 16 stores various kinds of knowledge information. Further, the content providing device 10 functions as a knowledge base which provides the various kinds of knowledge information to the user terminals 20 as the contents via the network N.

Further, in response to a log-in request from the user terminal 20, the user authentication section 11 performs user authentication by judging whether or not a user ID and a password transmitted from the user terminal 20 match with the user ID and the password stored in advance in the user information storage section 15. According to the result of judgment, the user authentication section 11 permits the user terminal 20 to log in and permits the user terminal 20 to use the knowledge base, when the user ID and the like match with each other and authentication is succeeded.

Further, the content output section 12 (content output unit) receives an access request for the content as the knowledge information from the user terminal 20 that is permitted to log in. This access request may include information which specifies target content the user desires to browse or may include a request to search content such as information regarding a search keyword and category designation, for example. In a case where the access request includes the search request information, the content output section 12 searches and extracts the target content from the content storage section 16, and transmits the content to the user terminal 20. Upon this, the user terminal 20 can display the acquired content on the browser.

Further, when transmitting the target content requested by the user terminal 20 to the user terminal 20, the content output section 12 also transmits access information (related contents information) to the related contents that are related to the target content. For example, in a case where the target content requested by the user terminal 20 is the "content A", it is assumed that "content C" and "content D" are related to "content A". On that condition, normally, as shown on a screen 21 of the user terminal 20 of FIG. 6A, information of the "content A" is transmitted to the user terminal 20 so that only the "content A" can be displayed on a browser 1 (B1). In the meantime, with the exemplary embodiment, the access information is transmitted to the user terminal 20 so that links which make it accessible to the "content C" and "content D" are displayed below the "content A" on the browser 1 (B1) as shown on the screen 21 of the user terminal 20 of FIG. 6B. Extraction of the related contents based on the target contents will be described later.

Furthermore, as described above, the browsing log acquiring section 13 (access history acquiring unit) acquires a browsing log (access history information) showing the history of access to the content made by the user terminal 20 every time the content output section 12 transmits the content in response to the content browsing request sent from the user terminal 20, and stores it to the browsing log storage section 17.

Specifically, the browsing log acquiring section 13 acquires and stores the browsing logs as in the table shown in FIG. 3. "Browsing log ID" in the table is a number for uniquely recognizing the browsing log, i.e., a record for a single content. "User ID" is information for specifying the user terminal 20 that has transmitted a request for browsing, and it is acquired from the user terminal 20 when the user terminal 20 logs in to the content providing device 10. "Session ID" (application identification information) is information for identifying each browser screen opened on the user terminal 20. "Content ID" (content identification information) is identification information for specifying the content that is requested by the user terminal 20, and is transmitted to the user terminal 20, i.e. the content browsed by the user. "Time" (access date and time information) shows time at which the content is transmitted to the user terminal 20, i.e., time at which the user browsed the content.

The browsing log as described above is acquired and stored for each content browsed by the user. That is, in the case of FIG. 3, information (record) of one row is added every time a single content is browsed.

Further, the relevancy setting section 14 (relevancy setting unit) generates a group of related contents and relevance information (relevance degree record) showing the degree of the relevance regarding the group of related contents by referring to the browsing logs stored in the above-described browsing log storage section 17, and stores those to the relevance information storage section 18.

Specifically, the relevancy setting section 14 first acquires a new browser log (new record). Then, the relevancy setting section 14 refers to "time" within the browsing log, and acquires other browsing logs (records) that are acquired within a range of prescribed time that is earlier than the latest browsing log by a preset threshold value (five minutes) from the browsing log storage section 17. Then, among the acquired records, the relevancy setting section 14 selects the record whose user ID and session ID are the same as those of the latest browsing log and whose content ID is different from that of the latest browsing log. Further, the relevancy setting section 14 relates the group of selected browsing log and the latest browsing log, and stores the group as a single relevance-degree record to the relevance information storage section 18 as in the relevancy table shown in FIG. 4A. That is, the content accessed with the latest browsing log and the content accessed with the selected browsing log are stored in a related manner.

As described above, to have the same session ID is taken as a condition for relating the contents, so that the contents browsed sequentially on the same browser screen operating on the user terminal 20 can be related to each other. That is, contents browsed on different browser screens are not related to each other, even though those are browsed on the same user terminal 20.

However, the condition for relating the contents by the relevancy setting section 14 is not limited to the condition described above. For example, it is necessary to mutually relate the content browsed via a specific browser to the content that is browsed by another browser opened automatically by selecting a link displayed on the content browsed via the specific browser. For corresponding to such case, even if the session IDs are different, for example, the browsing log having a session ID that can be judged as being the browser generated from being derived from the specific browser can be related to the browsing log. Therefore, when judged that the session IDs correspond to each other according to a preset judging standard, the relevancy setting section 14 relates the contents browsed with the browsing logs that have the corresponding session IDs even if the session IDs are not the same.

Further, the relevancy table includes information such as "relevance degree ID" allotted uniquely to the group of related contents, "content ID_1" and "content ID_2" showing the group of related contents, and "point" (relevance degree information) showing the relevance degree between the contents in the group. The "point" is recorded by adding up the appeared numbers of the contents in the same group. Therefore, when a contents group that is not in the relevancy table appears, the relevancy setting section 14 generates a new relevance degree record, and sets "1" in the section of "point". When an already-existing contents group appears, the relevancy setting section 14 adds "1" to the section of "point" in the existing record. Thereby, as described above, it is so set that the value in the "point" of the group of contents that are often related to each other because their browsing times are close and are browsed with the same browser, for example, becomes larger gradually, and the relevance degree of the contents group comes to have a high value.

The relevance degree setting method by the relevancy setting section 14 is not limited to the method described above. Further, the relevancy setting section 14 may not have to set the relevance degree. That is, the related contents groups may simply be stored without providing the section of "point" in the relevance degree table.

Now, the content output section 12 (content output unit) will be described again. As described above, when there is a request for the content from the user terminal 20, the content output section 12 searches the related contents that are related to the target content. At this time, as described above, the content output section 12 selects the related contents preferentially from the one having a high "point" by referring to the relevance degree table stored in the relevance information storage section 18, and transmits link information (URL: uniform resource locator) that is access information for the related content to the user terminal 20 along with the target content. For example, related contents in the number corresponding to a preset threshold value may be selected from the one with the highest "point".

The content output section 12 may transmit the information of the related content itself to display it on the user terminal 20 along with the information of the target content. Further, the related content to be selected is not limited to the contents that have a high relevance degree with respect to the target content, for example. It is also possible to select all the related contents that are related even once to the target content.

(Actions)

Next, actions of the above-described content providing system, particularly, the action of the content providing device 10, will be described.

First, the user operates the user terminal 20 to make access to the content providing device 10 that opens the knowledge base via the browser installed into the user terminal 20. Upon this, the content providing device 10 requests login information for using the knowledge base to the user terminal 20. In response, the user terminal 20 inputs the user ID and the password on the browser screen, and transmits that information. Then, the user authentication section 11 of the content providing device 10 performs user authentication based on the transmitted user ID and password and the information stored in advance to the user information storage section 15, and accepts a browsing request from the user terminal 20 that has been successfully authenticated. For example, the user terminal 20 inputs and transmits the keyword on the browser screen to request search of the content that contains the keyword.

Subsequently, the content output section 12 of the content providing device 10 conducts a search within the content storage section 16 based on the keyword transmitted from the user terminal 20, extracts the content (knowledge information) containing the keyword, and transmits the content to the user terminal 20. Upon receiving the content, the user terminal 20 displays the content on the display unit 21 with the started-up browser 1 (B1). For example, "content A (B11)" is displayed as shown in FIG. 6A.

At this time, the content providing device 10 acquires the browsing log of the user terminal 20 by using the browsing log acquiring section 13 (step S1 of FIG. 7, access history acquiring step). That is, the content providing device 10 records the information showing the history of the transmitted content in the browsing log storage section 17 as the access history, after transmitting the contents to the user terminal 20. Specifically, as shown in FIG. 3, ID is given to the browsing logs in order of browsing of the contents by the user terminal 20, and those are stored as records. As described above, the browsing log (record) includes the browsing log ID, the user ID used at the time of login authentication, the session ID for identifying the browser screen that is making the access, the content ID for identifying the browsed content, and the time at which the content is browsed.

Now, the browsing log will be described in detail. For example, as shown in FIG. 5A, it is assumed that two browser screens, i.e., the browser 1 screen (B1) and the browser 2 screen (B2), are opened on the user terminal 20 of the user X. In that case, different session IDs for the browsers 1 and 2 are generated and transmitted to the content providing device 10. For example, it is assumed that the session ID corresponding to the browser 1 screen (B1) is "aaaa", and the session ID corresponding to the browser 2 screen (B2) is "bbbb". Further, it is assumed on the browser 1 screen (B1) that a state where "content C" is being browsed is transited to a state where "content B" is being browsed as shown in FIG. 5B. It is assumed on the browser 2 screen (B2) that "content F" is being browsed. In that case, regarding the browsing logs of the browser 1 screen (B1), the browsing log IDs shown in FIG. 3 are "0008" and "0009", for example. Further, regarding the browsing log of the browser 2 screen (B2), the browsing log ID is "0007", for example.

Then, as described above, when the browsing log acquiring section 13 newly acquires a browsing log, the relevance setting section 14 starts processing. First, the relevance setting section 14 refers to the browsing log storage section 17, and goes back the time from the latest browsing log (record) to acquire a list of other browsing logs (records) that are recorded within the time of a preset threshold value (step S2 of FIG. 7). Subsequently, from the acquired list of the browsing logs, the relevance setting section 14 selects the browsing logs (records) having the user ID and the session ID that are the same as those of the latest browsing log (Yes in step S3 of FIG. 7, and Yes in step S4) and having the content ID different from that of the latest browsing log (Yes in step S5). Then, as described above, the relevance setting section 14 relates the latest browsing log to the group of selected browsing logs, and stores those to the relevance degree table formed in the relevance information storage section 18 (step S6 of FIG. 7, relevancy setting step).

At this time, the relevance setting section 14 calculates the relevance degree between the related browsing logs, i.e., "point" which shows the relevance degree between the contents, to store it to the relevance degree record, and records it in the relevance degree table. Now, an example of the relevance degree table will be described by referring to FIG. 4A. Each of the records in the relevance degree table has the relevance degree ID, the content ID_1, the content ID_2, and the point. In the content ID_1 and the content ID_2, as described above, the contents ID of the browsed contents contained in both of the related browsing logs are stored, respectively. Further, stored in the section of "point" is a value that is obtained by adding up "1" for the number of appearances of the combination of the content IDs.

Therefore, the relevance setting section 14 first generates a record by giving a new relevance degree ID, only when a record of the combination of the content IDs contained in the both browsing logs judged as being related is not within the relevance degree table. In the meantime, in a case where there already exists the record of the combination of the contents IDs in the relevance degree table, the relevance setting section 14 adds "1" to the point of the record of that combination without generating a new record. Thereby, the point within the record of the combination of the contents with a large number of appearances comes to have a large value.

Now, the above-described processing will be described in a specific manner by referring to a case where the browsing log whose browsing log ID shown in FIG. 3 is "0009" is acquired newly. It is assumed here that "five minutes" is set in advance as a threshold value of the time interval for relating the browsing logs.

First, upon acquiring the browsing log (record) of the browsing log ID "0009" (step S1 of FIG. 7), the relevance setting section 14 extracts the records of the browsing logs that are within the 5-minute time range that is five minutes before that time (step S2 of FIG. 7). Here, the records of the browsing logs whose browsing log IDs are "0005", "0006", "0007", and "0008" are extracted. Subsequently, among the acquired records, the relevance setting section 14 selects the record that has the same user ID and session ID as those of the latest browsing log "0009" (steps S3, S4 of FIG. 7) and has a different content ID (step S5 of FIG. 7). The record of the browsing log ID "0008" corresponds to such record. Subsequently, the relevance setting section 14 generates a record of the combination of the related browsing logs, i.e., the latest browsing log "0009" and the selected browsing log "0008", and stores it to the relevance information storage section 18 (step S6 of FIG. 7). With this, it can be seen that the "content B" and the "content C" are browsed within five minutes with the same browser (aaaa) that is operated by the same user (X). Therefore, those contents can be related to each other.

At this time, as shown in the relevance degree ID "0002" of FIG. 4A, when the record of the combination of the "content B" and the "content C" is already stored in the relevance information storage section 18, the relevancy setting section 14 adds "1" to the point of the record "0002". In the meantime, in a case where the combination of the contents is not stored in the relevance degree table, the relevancy setting section 14 generates a record of that combination newly, sets the point thereof as "1", and adds that record to the relevance degree table. For the relevance degree records stored in the relevance degree table, the order the contents are browsed is not considered as an issue. For example, it is considered that a case where the content C is browsed after browsing the content B and a case where the content B is browsed after browsing the content C are considered the same, and it simply needs to form a single relevance degree record showing the combination of the contents B and C.

Thereafter, it is assumed that a request for browsing contents is transmitted by a user terminal 20 that is operated by another user. For example, it is assumed that the user terminal 20 requests "content A" to the content providing device 10 (step S11 of FIG. 8). Upon this, the content output section 12 of the content providing device 10 first acquires data of the requested target content itself from the content storage section 16 (step S12 of FIG. 8).

Subsequently, the content output section 12 acquires the record which contains the target content in "content ID_1" or "content ID_2" from the relevance degree table within the relevance information storage section 18 (step S13 of FIG. 8). For example, when the target content is "content A", the content output section 12 acquires the records containing the "content A", i.e., the records whose relevance degree IDs are "0001", "0003", and "0004" in the case of FIG. 4A.

Subsequently, the content output section 12 rearranges the records that are acquired in the above-described manner in order from the one with a higher "point" (step S14 of FIG. 8). With this, the records are rearranged in order of the relevance degree IDs "0003", "0004", and "0001". Then, the content output section 12 selects the records of highest order to the order of a preset threshold value from the rearranged records as the records showing the groups of contents with high relevance degrees (step S15 of FIG. 8). In this case, the content output section selects the two records from the highest order shown in FIG. 4B.

Then, along with the target content requested by the user terminal 20, the content output section 12 transmits link information that is the access information for other contents that are related to the target content in the records selected in the manner described above to the user terminal 20 (step S16 of FIG. 8). In the above-described case, the "content C" and the "content D" are selected as the contents having high relevance degrees with respect to the "content A". Thus, as shown in FIG. 6B, the content output section 12 displays the link information (B12) for making it possible to access to the information of the "content C" and the "content D" along with the information (B11) of the "content A" itself on the browser 1 screen (B1) that is displayed on the display section 21 of the user terminal 20.

With this, the user of the user terminal 20 can easily browse not only the content A but also the other contents C and D which are judged as having high relevance degrees by the actions of the other users, etc.

As described above, with the exemplary embodiment, the contents that are actually accessed from the same user within a prescribed time range are related to each other. Therefore, the contents with high relevance degree can be related to each other efficiently. Further, use of the relevance data makes it possible to extract other contents that are related appropriately to the searched target content. Therefore, efficiency for search of information and supply of information can be improved.

While it is described above that the content output section 12 displays the address information of the related content for the user terminal 20 along with the target content, it is also possible to transmit the data of the related content itself so as to display that data along with the target content.

Further, in the above, described is the case where the relevance setting section 14 relates the contents and measures the relevance degree therebetween immediately after a new browsing log is recorded. However, the processing of the relevance setting section 14 is not limited to be executed at the above-described timing. For example, the relevance setting section 14 may not have to measure the relevance degree even when a new browsing log is recorded, but may store a group of contents considered as relevant among the acquired browsing logs to the browsing log storage section 17 in advance at arbitrary timing. For example, only the relevancy between the contents is judged from the browsing logs, and the difference between the times at which the two contents are browsed is also stored in addition to the group of the contents. Thereafter, the processing such as calculation of the relevance degree is performed in the manner described above based on the accumulated information at preset timing such as once a week.

Through this, the information relating all the contents can be accumulated, so that it is possible to execute various kinds of analyses such as analyses of browsing states of the users by utilizing such information.

Second Exemplary Embodiment

Figure 9:
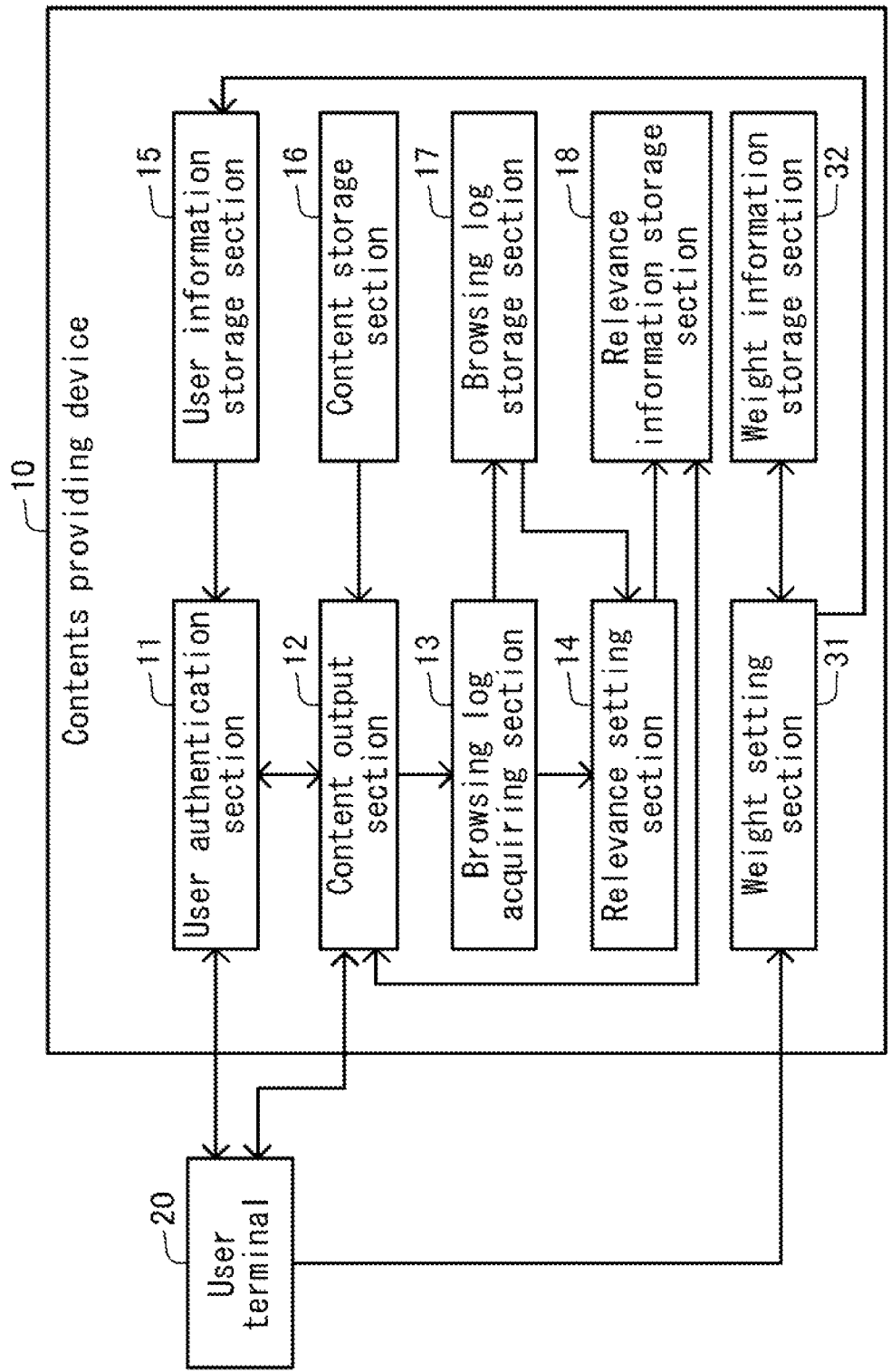
FIG. 9 is a functional block diagram showing a structure of a content providing device according to a second exemplary embodiment.

Next, a second exemplary embodiment of the present invention will be described by referring to FIG. 9-FIG. 11. FIG. 9 is a functional block diagram showing the structure of the content providing device. FIG. 10 and FIG. 11 are tables showing examples of information stored in the content providing device.

The content providing device according to the second exemplary embodiment employs almost the same structure as that of the device described in the first exemplary embodiment. However, a method for setting the relevance degree between the related contents is different. Hereinafter, mainly the different points with respect to the first exemplary embodiment will be described.

First, as shown in FIG. 9, the content providing device 10 according to the second exemplary embodiment includes a weight setting section 31 and a weight information storage section 32 in addition to the content providing device disclosed in the first exemplary embodiment described above.

The weight information storage section 32 stores weight information which is prepared in advance and can be selected for each user. As the weight information, a plurality of records each specified with a combination of group ID and weight ID are stored as in FIG. 10.

The group ID shows a set of weight setting, and time difference within the group and a corresponding weight value are set for each weight ID. Further, "minimum value of time threshold value" and "maximum value of time threshold value" contained in each record show a range of difference between each of the browsed times when contents are browsed by a same user and with a same browser. Furthermore, "weight" shows a point weight that is given to the record which specifies the group of related contents, when the difference between the browsed times of the contents falls within the threshold value. That is, the second exemplary embodiment does not give the same point to all the groups of the contents whose difference in the browsed times are within the threshold value. Rather, the second exemplary embodiment can change the point depending on the time differences.

Now, a specific example of the weight information will be described. The group whose group ID=1 shown in FIG. 10 is a group of three records that are set to give weight "5" when the browsed time difference is 0 min.-10 min., to give weight "3" when the difference is 10 min.-30 min., and to give weight "1" when the difference is 30 min.-1 hr. As in this example, for the weight information (weighting information), a higher value "weight" (weight value) is set for a shorter browsed time difference between the related contents.

Further, the above-described weight information can be set for each user (for each user terminal). Specifically, the weight setting section 31 receives designation of weight information from the user terminal 20, and stores the weight group ID designated by the user to the user information storage section 15 along with the user ID. Thereby, when the user of the specific user ID is browsing the content with the user terminal, the weight information of the group ID that is related to the specific user ID can be utilized as the relevance degree of the group of the browsed content.

For example, it is assumed that the weight information of the weight group ID "0001" is designated by the user of the user ID "X". Upon this, as shown in FIG. 11, a record where the user ID "X" and the weight group ID "0001" are related is stored in a weight table. When different contents are browsed by the same user X with a same browser, the value of "weight" set to the weight group "0001" is specified according to the difference of the browsed times of the different contents. For example, when the user browses the content A and then the content B, the weight "5" is specified when the browsed time difference is 0 min.-10 min., the weight "3" is specified when the browsed time is 10 min.-30 min., and the weight "1" is specified when the browsed time difference time is 30 min.-1 hr. (see FIG. 10). Then, the specified weight value is added as it is to the point showing the relevance degree between the content A and the content B.

Through the above processing, the point of the content group becomes larger as the browsed time difference gets smaller. Inversely, the point of the content group becomes smaller as the browsed time difference gets larger.

Then, as in the case of the above-described first exemplary embodiment, the content output section 12 preferentially selects the content from the other contents in order from the one having a high relevance degree with respect to the target content requested by the user terminal, and transmit the access information for that other content to the user terminal along with the target content.

In the above, the case where the weight information can be set for each user has been described. However, the weight information for the weight group ID "1" may also be applied to all the users, for example.

Third Exemplary Embodiment

Figure 12:
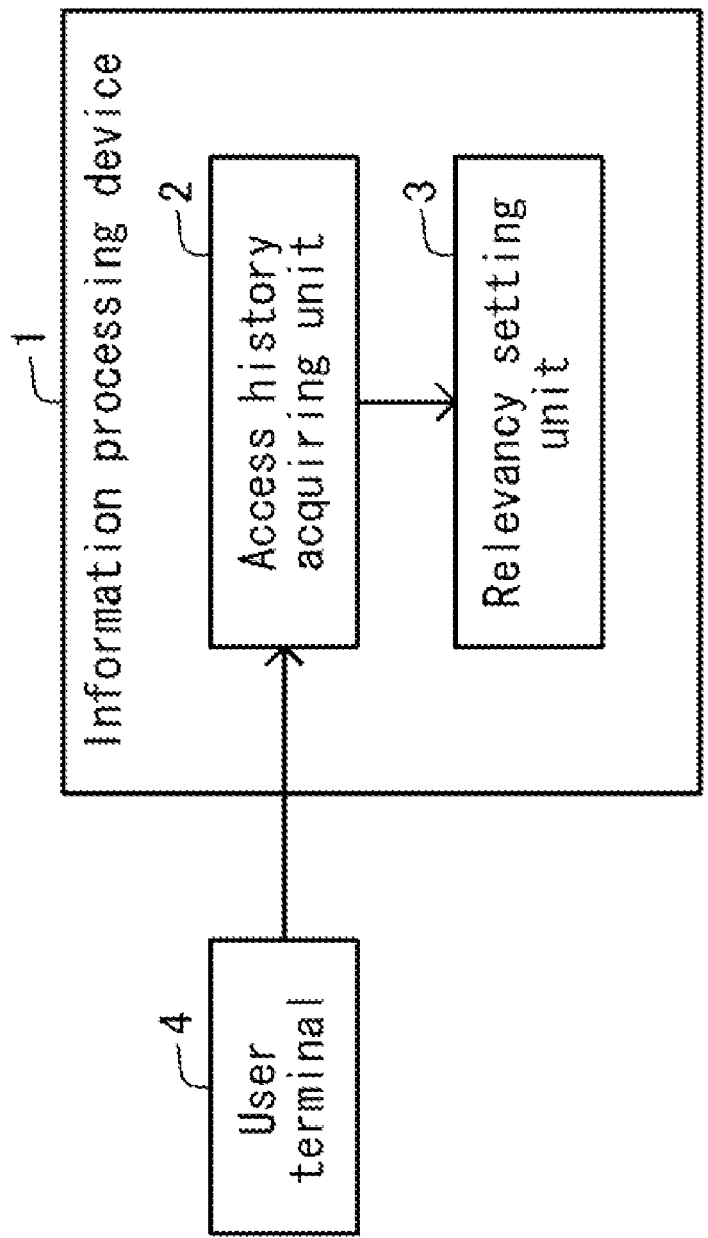
FIG. 12 is a functional block diagram showing a structure of an information processing device according to a third exemplary embodiment of the present invention.

A third exemplary embodiment of the present invention will be described by referring to FIG. 12. FIG. 12 is a functional block diagram showing a structure of an information processing device. In the third exemplary embodiment, a rough description of the information processing device functioning as the above-described content providing device 10 will be presented.

As shown in FIG. 12, the information processing device 1 according to this exemplary embodiment includes: an access history acquiring unit 2 which acquires and stores, for each of the accessed contents, access history information showing access history for the contents accessed by a user terminal 4 by utilizing a content access application installed to the user terminal 4; and a relevancy setting unit 3 which relates the contents accessed by the user terminal based on the access history information acquired by the access history acquiring unit, and stores the relevance information showing the related state between the contents.

Further, as the access history information, the access history acquiring unit acquires content identification information which identifies the accessed content, access date and time information which shows the date and time at which the content is accessed, and application identification information for identifying the content access application making access to the content, which is different for each of the content access applications operated on the user terminal.

Further, the relevancy setting unit 3 generates and stores the relevance information by relating the content identification information contained in each piece of the access history information corresponding to each of the different contents based on the access date and time information and the application identification information contained in each piece of the access history information corresponding to each of the different contents.

Furthermore, in the information processing device, the relevancy setting unit employs a structure which, among the access history information whose access date and time information contained in each piece of the access history information corresponding to each of the different contents is within a preset time range, mutually relates the content identification information contained in each piece of the access history information whose application identification information contained in each piece of the access history information is judged to correspond mutually based on a preset judging standard.

Further, in the information processing device, the relevancy setting unit employs a structure which, among the access history information whose access date and time information contained in each piece of the access history information corresponding to each of the different contents is within the preset time range, mutually relates the content identification information contained in each piece of the access history information whose application identification information contained in each piece of the access history information is judged to be the same with each other.

According to the present invention, first, when the user makes access to a target content by the user terminal, the information processing device acquires the access history information that shows the access history for that content. Specifically, the information processing device acquires the access history information which contains the content identification information for identifying the accessed content, the date and time information showing the accessed date and time, and the application identification information for identifying the content access application making access to the content. The application identification information is the information set differently for the content access applications operated on the user terminal and making access to the target content, i.e., for each window of the so-called browsers opened for making access to the target content.

Subsequently, based on the acquired access history information, the information processing device mutually relates the contents that are related to each other. Specifically, among the access history information of the contents accessed within the preset time range, the information processing device mutually relates the contents corresponding to each other, e.g., the application identification information for those contents matches with each other. Thereby, the content identification information of the contents accessed by the same content access application or by a content access application generated by being derived from that content access application is related with each other.

Through the above, the contents actually accessed by the user by the same content access application or by the content access application generated by being derived from that content access application are related to each other, so that the contents with high relevance degree can be related to each other efficiently. As a result, other contents that are properly related to a prescribed content can be extracted by utilizing the relevance information, thereby making it possible to improve the efficiency for searching information and supplying information.

Further, the information processing device employs a following structure. That is the information processing device includes a content output unit which, when the user terminal accesses to a prescribed content, outputs to the user terminal the related content information for specifying other contents that are related to the accessed content based on the relevance information.

Furthermore, the information processing device employs such a structure that: the relevancy setting unit generates relevance degree information showing a relevance degree between the contents that are related based on the access history information, and stores the relevance degree information by including it in the relevance information; and based on the relevance degree information, the content output unit outputs, to the user terminal, the related content information for specifying the other contents related to the accessed content in order by giving priority to the related information having a higher relevance degree with respect to the accessed content Moreover, the information processing device employs such a structure that the relevancy setting unit generates a value, which is obtained by adding numbers of pieces of the relevance information which are of a same combination of the related contents, as the relevance degree information.

Further, the information processing device employs such a structure that: weight information, in which a higher weight value is set for the related contents whose access date and time information contained in each piece of the access history information shows a shorter time interval, is stored; and as the relevance degree information between the contents of the same combination of the related contents, the relevance setting unit generates, based on the weight information, a value obtained by adding the weight value that is set by corresponding to time intervals of the access date and time information contained each piece of the access history information of the related contents.

Furthermore, the information processing device employs such a structure that: the weight information can be set for each of the user terminals; and as the relevance degree information between the contents of the same combination of the related contents, the relevance setting unit generates, based on the weight information that is set by corresponding to the user terminal making access to the contents, a value obtained by adding the weight value that is set by corresponding to the time intervals of the access date and time information contained each piece of the access history information of the related contents.

Further, the above-described information processing device can be achieved by having a prescribed program installed into the information processing device. Specifically, the program as another aspect of the present invention is a program which causes an information processing device to execute: an access history acquiring unit which, for each of accessed contents, acquires and stores access history information showing access history for the contents accessed by a user terminal by utilizing a content access application installed to the user terminal; and a relevancy setting unit which relates the contents accessed by the user terminal based on the access history information acquired by the access history acquiring unit, and stores relevance information showing a relevance state between the contents.

Furthermore, the access history acquiring unit built within the information processing device with the above-described program is provided with a function which, as the access history information, acquires content identification information which identifies the accessed content, access date and time information which shows the date and time at which the content is accessed, and application identification information for identifying a content access application making access to the content, which is different for each of the content access applications operated on the user terminal. Moreover, the relevancy setting unit is provided with a function which generates and stores the relevance information by relating the content identification information contained in each piece of the access history information corresponding to each of the different contents based on the access date and time information and the application identification information contained in each piece of the access history information corresponding to each of the different contents.

Further, the program provides the relevancy setting unit with a function which, among the access history information whose access date and time information contained in each piece of the access history information corresponding to each of the different contents is within a preset time range, mutually relates the content identification information contained in each piece of the access history information whose application identification information contained in each piece of the access history information is judged to correspond mutually based on a preset judging standard.

Furthermore, an information processing method executed by operating the above-described information processing device: acquires and stores, for each of accessed contents, access history information showing access history for the contents accessed by a user terminal by utilizing a content access application installed to the user terminal; and relates the contents accessed by the user terminal based on the access history information acquired by the access history acquiring unit, and stores relevance information showing a relevance state between the contents.

When acquiring the access history information, content identification information which identifies the accessed content, access date and time information which shows the date and time at which the content is accessed, and application identification information for identifying the content access application making access to the content, which is different for each of the content access applications operated on the user terminal, are acquired as the history information. Further, when storing the relevance information, the relevance information is generated and stored by relating the content identification information contained in each piece of the access history information corresponding to each of the different contents based on the access date and time information and the application identification information contained in each piece of the access history information corresponding to each of the different contents.

Furthermore, the information processing method employs such a structure that when storing the relevance information, among the access history information whose access date and time information contained in each piece of the access history information corresponding to each of the different contents is within a preset time range, the content identification information contained in each piece of the access history information whose application identification information contained in each piece of the access history information is judged to correspond mutually based on a preset judging standard is related to each other.

The inventions of a program and an information processing method having the above-described structures can provide the same effects as those of the information processing device described above, so that it is also possible with those inventions to achieve the exemplary object of the present invention described above.

While the present invention has been described by referring to each of the exemplary embodiments thereof, the present invention is not limited to those embodiments. It will be understood those of ordinary skill in the art that various changes in form and details may be made therein without departing from the spirit and scope of the present invention as defined by the appended claims.

The present invention has industrial applicability, since it can be utilized to websites which provide contents to user terminals, e.g., knowledge bases and word-of-mouth sites, and to information processing device such as web servers provided between the websites and the user terminals.

What is claimed is:

1. An information processing device, comprising:
   an access history acquiring unit which, for each of accessed contents, acquires and stores access history information showing access history for the contents accessed by a user terminal by utilizing a content access application installed to the user terminal; and
   a relevancy setting unit which relates the contents accessed by the user terminal based on the access history information acquired by the access history acquiring unit, and stores relevance information showing a relevance state between the contents, wherein:
   as the access history information, the access history acquiring unit acquires content identification information which identifies the accessed content, access date and time information which shows date and time at which the content is accessed, a user ID for identifying the user terminal accessing the content, and application identification information for identifying a browser screen as the content access application making access to the content, which is different for each browser screen operated on the user terminal; and
   the relevancy setting unit generates and stores the relevance information by relating the plural content identification information having the same user ID and the same application identification information to each other among the content identification information contained in each piece of the access history information corresponding to each of the different contents based on the access date and time information and the user ID and the application identification information contained in each piece of the access history information corresponding to each of the different contents.

2. The information processing device as claimed in claim 1, wherein among the access history information whose access date and time information contained in each piece of the access history information corresponding to each of the different contents is within a preset time range, the relevancy setting unit mutually relates the content identification information contained in each piece of the access history information whose application identification information contained in each piece of the access history information is judged to correspond mutually based on a preset judging standard.

3. The information processing device as claimed in claim 1, wherein among the access history information whose access date and time information contained in each piece of the access history information corresponding to each of the different contents is within a preset time range, the relevancy setting unit mutually relates the content identification information contained in each piece of the access history information whose application identification information contained in each piece of the access history information is judged to be the same with each other.

4. The information processing device as claimed in claim 1, comprising a content output unit which, when the user terminal accesses to a prescribed content, outputs to the user terminal the related content information for specifying other contents that are related to the accessed content based on the relevance information.

5. The information processing device as claimed in claim 4, wherein:
the relevancy setting unit generates relevance degree information showing a relevance degree between the contents that are related based on the access history information, and stores the relevance degree information by including it in the relevance information; and
based on the relevance degree information, the content output unit outputs, to the user terminal, the related content information for specifying the other contents related to the accessed content in order by giving priority to the related information having a higher relevance degree with respect to the accessed content.

6. The information processing device as claimed in claim 5, wherein the relevancy setting unit generates a value, which is obtained by adding numbers of pieces of the relevance information which are of a same combination of the related contents, as the relevance degree information.

7. The information processing device as claimed in claim 5, wherein:
weight information, in which a higher weight value is set for the related contents whose access date and time information contained in each piece of the access history information shows a shorter time interval, is stored; and
as the relevance degree information between the contents of the same combination of the related contents, the relevance setting unit generates, based on the weight information, a value obtained by adding the weight value that is set by corresponding to time intervals of the access date and time information contained each piece of the access history information of the related contents.

8. The information processing device as claimed in claim 7, wherein:
the weight information can be set for each of the user terminals; and
as the relevance degree information between the contents of the same combination of the related contents, the relevance setting unit generates, based on the weight information that is set by corresponding to the user terminal making access to the contents, a value obtained by adding the weight value that is set by corresponding to the time intervals of the access date and time information contained each piece of the access history information of the related contents.

9. An information processing device, comprising:
an access history acquiring means which, for each of accessed contents, acquires and stores access history information showing access history for the contents accessed by a user terminal by utilizing a content access application installed to the user terminal; and
a relevancy setting means which relates the contents accessed by the user terminal based on the access history information acquired by the access history acquiring means, and stores relevance information showing a relevance state between the contents, wherein:
as the access history information, the access history acquiring means acquires content identification information which identifies the accessed content, access date and time information which shows the date and time at which the content is accessed, a user ID for identifying the user terminal accessing the content, and application identification information for identifying a browser screen as the content access application making access to the content, which is different for each browser screen operated on the user terminal; and
the relevancy setting means generates and stores the relevance information by relating the plural content identification information having the same user ID and the same application identification information to each other among the content identification information contained in each piece of the access history information corresponding to each of the different contents based on the access date and time information and the user ID and the application identification information contained in each piece of the access history information corresponding to each of the different contents.

10. A non-transitory computer-readable storage medium that stores a program comprising instructions for causing an information processing device to execute:
an access history acquiring unit which, for each of accessed contents, acquires and stores access history information showing access history for the contents accessed by a user terminal by utilizing a content access application installed to the user terminal; and
a relevancy setting unit which relates the contents accessed by the user terminal based on the access history information acquired by the access history acquiring unit, and stores relevance information showing a relevance state between the contents, wherein:
the access history acquiring unit is provided with a function which, as the access history information, acquires content identification information which identifies the accessed content, access date and time information which shows the date and time at which the content is accessed, a user ID for identifying the user terminal accessing the content, and application identification information for identifying a browser screen as a content access application making access to the content, which is different for each browser screen operated on the user terminal; and
the relevancy setting unit is provided with a function which generates and stores the relevance information by relating the plural content identification information having the same user ID and the same application identification information to each other among the content identification information contained in each piece of the access history information corresponding to each of the different contents based on the access date and time information and the user ID and the application identification information contained in each piece of the access history information corresponding to each of the different contents.

11. The non-transitory computer-readable storage medium as claimed in claim 10, wherein the relevancy setting unit is provided with a function which, among the access history information whose access date and time information contained in each piece of the access history information corresponding to each of the different contents is within a preset time range, mutually relates the content identification information contained in each piece of the access history information whose application identification information contained in each piece of the access history information is judged to correspond mutually based on a preset judging standard.

12. An information processing method, comprising:

for each of accessed contents, acquiring and storing access history information showing access history for the contents accessed by a user terminal by utilizing a content access application installed to the user terminal; and relating the contents accessed by the user terminal based on the access history information acquired by the access history acquiring unit, and storing relevance information showing a relevance state between the contents, wherein:

when acquiring the access history information, content identification information which identifies the accessed content, access date and time information which shows the date and time at which the content is accessed, a user ID for identifying the user terminal accessing the content, and application identification information for identifying a browser screen as the content access application making access to the content, which is different for each browser screen operated on the user terminal, are acquired as the history information; and when storing the relevance information, the relevance information is generated and stored by relating the plural content identification information having the same user ID and the same application identification information to each other among the content identification information contained in each piece of the access history information corresponding to each of the different contents based on the access date and time information and the user ID and the application identification information contained in each piece of the access history information corresponding to each of the different contents.

13. The information processing method as claimed in claim 12, wherein when storing the relevance information, among the access history information whose access date and time information contained in each piece of the access history information corresponding to each of the different contents is within a preset time range, the content identification information contained in each piece of the access history information whose application identification information contained in each piece of the access history information is judged to correspond mutually based on a preset judging standard is related to each other.

\* \* \* \* \*